Patented July 8, 1941

2,248,823

UNITED STATES PATENT OFFICE 2,248,823

METHOD FOR EXTRACTING DRYING OILS FOR COATING COMPOSITIONS

Floyd R. Quinby, Houston, Tex., assignor of one-half to Kirk Griggs, Houston, Tex.

No Drawing. Application September 15, 1938, Serial No. 230,114

2 Claims. (Cl. 260—412.3)

My invention or discovery relates to drying oils for coating compositions such as paints, enamels and varnishes.

I have discovered an oil of vegetable origin which possesses drying qualities considerably superior to linseed oil and at least as good as China wood oil or tung oil. My discovery provides a new product forming a substitute for linseed oil or China wood oil in coating compositions where these materials are employed as drying oils.

The new drying oil which I have discovered is obtained from the inner kernel of the nut of the Chinese tallow tree (Sapium sebiferum) which grows abundantly in some Southern States and especially in the region of Houston, Texas.

The tallow tree bears a fruit consisting of a hull containing three nuts, each nut being surrounded by a coating of tallow-like substance from which the tree receives its common name "tallow tree." The three nuts within the hull are formed of a hard shell filled with a rich oil-bearing meat, and it is the oil contained within this meat which I have discovered to possess excellent qualities for use as a drying oil. I have also discovered that the tallow-like substance surrounding the nuts of the tallow tree is useful in the manufacture of soap by saponifying with caustic soda or sodium carbonate in the same general manner as in the manufacture of soap from other greases. The tallow is also useful in candle making or as a base for cosmetics in the form of vanishing cream. I have further discovered that the hulls of the tallow tree nut kernel when freed of the tallow-like substance, and the meal from the kernel, form an excellent fertilizer and may be used instead of cottonseed meal.

So far as I am aware, no one has heretofore made any practical use of the substances which may be derived from the fruit of the tallow tree. Because of its quick growth and ample foliage, the tallow tree has heretofore been used as a shade tree but no useful purpose has been found for the fruit which is annually yielded by the tree and which heretofore has been considered as a nuisance. The discoveries which I have made of the useful properties of the various materials which may be derived from the tallow tree fruit forms the basis for a new industry which will turn into useful purposes a product of nature which heretofore has been considered a nuisance.

My invention also involves methods of extracting the oil from the nut of the tallow tree.

The drying oil of my discovery may be used raw and without any preliminary cooking or processing. In this respect, it is superior to China wood oil, since raw China wood oil dries with a wrinkled and frosted appearance, and the cooking of the China wood oil which is necessary to overcome this difficulty gives the oil such body as to cause the paint to "pull" under the brush, which is objectionable. The tallow tree oil can be used raw, and gives an easily spreading paint equal in waterproofness to the paint made with China wood oil. I have also discovered that the tallow tree oil is superior to linseed oil in that a film of the tallow tree oil on a glass surface will withstand the action of boiling water, but a film of linseed oil on glass will turn white and peel off under the action of boiling water.

The drying oil of my discovery has the further advantage that in the cooking of varnishes made with the oil, there is no danger of sudden polymerization as in the case of China wood oil.

Tallow tree oil may be used, in whole or in part, in place of linseed oil in practically all standard formulae for paints and enamels. It may be bodied like linseed oil by heating to 500° F. and holding it at this temperature until the desired body is reached.

A further advantage of the tallow tree oil over linseed oil in coating compositions is that in regions of high humidity, such as in the Gulf Coast regions, the quick drying properties and the waterproofness of the oil makes the compositions much more resistant to mildew.

Another most important advantage in the drying oil of my discovery is that it possesses a non-yellowing characteristic which makes it especially useful for the manufacture of white enamel. By actual tests made over a considerable period of time, I have found that enamels made from tallow tree oil will not yellow to any substantial extent. This characteristic is extremely important since it has not been possible heretofore to develop an enamel which remains white for any considerable period, and it has not been possible to retouch the enamel even within a few days without a noticeable difference in color.

In deriving the drying oil from the nut of the tallow tree, it is important that the oil be obtained free from the waxy or tallow-like substance surrounding the nut, otherwise the drying quality of the oil will be impaired.

One method of attaining the pure oil from the fruit is to boil the nuts as they are picked from the tree, whereupon a large part of the tallow will melt and float. The tallow is skimmed off and saved. After the tallow is thus removed an alkali such as sodium hydroxide or sodium carbonate is added in sufficient quantity to saponify the remaining tallow. This treatment renders the tallow envelope soft and tender in which condition it is readily removed by washing, and the tallow will no longer contaminate the oil in the process of recovery. The action of the alkaline solution may be accelerated by heating or boiling. After the seeds have been washed free from the tallow covering, they are then placed in a crusher and crushed fine enough to liberate the oil from the meat of the kernel. The seeds are then placed in a press and the oil is pressed out and recovered. If desired, the cake from the press may be further treated with a suitable solvent, such as petroleum spirit, to remove any additional oil which was not removed by the action of the press. The solvent would then be expressed from the cake and distilled, leaving the pure oil as a residue.

Instead of placing the crushed seeds in the press as described above, the crushed seeds may be taken from the crusher and treated with a suitable solvent, either hot or cold, and, after proper agitating, the solvent is drawn and distilled, leaving the pure oil as a residue. This process may be repeated until all of the oil is removed from the meal.

As indicated heretofore, the hulls of the seed as well as the meal of the kernel forms an excellent fertilizer material.

In the process described above in which the nuts are boiled, the tallow so recovered may be further refined or treated for various uses, such as soap making, candle making or as a base in vanishing and face creams.

As explained heretofore, tallow tree oil may be used generally in paint formulas to replace linseed oil or China-wood oil in whole or in part, as a drying oil. The following is a typical paint formula which is given merely for the purpose of illustration:

| | | |
|---|---|---|
| Titanated lithopone | pounds | 100 |
| 35% leaded zinc oxide | do | 70 |
| Silica | do | 15 |
| Asbestine | do | 15 |
| Refined tallow tree oil | do | 77.5 |
| Tallow tree oil varnish A | do | 22 |
| Bodied fish oil (Crystol K. heavy) | do | 7.8 |
| Naphtha (150–210° C. B. R.) | do | 6.5 |
| Drier (containing 10% lead 1% cobalt) | do | 3 |

The formula for enamel varnish A as given in the above formula is as follows:

| | | |
|---|---|---|
| Ester gum | pounds | 140 |
| Tallow tree oil | gallons | 26 |
| Naphtha | do | 30 |

Heat oil and gum to 550° F. and hold to desired body (12" string from glass plate). Cool to 450° F. and thin with naphtha. Add drier to give 4% lead, .03% manganese, .03% cobalt on oil.

The following is a typical formula for enamel made with tallow tree oil:

| | | | |
|---|---|---|---|
| Titanium dioxide | pounds | 100 | Roller |
| Zinc oxide (green seal) | do | 25 | mill |
| Varnish A | do | 25 | base |

Mill and reduce with

| | | |
|---|---|---|
| Tallow oil varnish A | pounds | 140 |
| Naphtha (150–210° C. B. R.) | do | 22 |
| Cobalt drier (containing 10% lead 1% cobalt) | do | 2 |

Like all formulas for paints, varnishes and enamels, the above formulas may be varied within wide limits to create finishes with certain desired properties. These formulas are given merely to illustrate the manner of its use in finishes.

Coating compositions made with tallow tree oil as a drying oil are superior to similar compositions employing linseed oil or Perilla oil, since the use of tallow tree oil results in greater waterproofness and durability, superior appearance of finish due to superior leveling qualities, a faster drying quality, increased ease of brushing and increased resistance to mildew.

In the appended claims the term "separating" is to be interpreted to apply to a process of separating the oil from the meat either by expressing the oil from the meat by crushing the meat or by using a solvent to extract the oil from the meat after the hulls have been cracked, or to a process involving both the crushing of the meat and the use of a solvent.

What I claim is:

1. The method of extracting oil from the kernels of the nut of the tree *Sapium sebiferum* which consists in boiling the tallow-covered nuts to remove the major portion of the tallow surrounding said nuts, then washing said nuts in an alkaline solution to saponify the tallow remaining on said nuts, washing said nuts to remove the saponified tallow, and crushing the tallow-free nuts, and separating the oil from the meat of the kernel.

2. The method of extracting oil from the kernels of the nut tree *Sapium sebiferum* which consists in removing the major portion of the tallow surrounding the nuts, then treating the nuts in a saponifying solution to saponify the tallow remaining on the nuts, then washing the nuts to remove the saponified tallow, and crushing the tallow-free nuts, and separating the oil from the meat of the kernel.

FLOYD R. QUINBY.